United States Patent [19]

Tanaka et al.

[11] 4,211,298
[45] Jul. 8, 1980

[54] OFFSET TRACTOR

[75] Inventors: Tomio Tanaka; Rinzo Yamano, both of Sakai, Japan

[73] Assignee: Kubota, Ltd., Osaka, Japan

[21] Appl. No.: 849,671

[22] Filed: Nov. 8, 1977

[30] Foreign Application Priority Data

Nov. 11, 1976 [JP] Japan ................................ 51-136468
Nov. 12, 1976 [JP] Japan ................................ 51-152675

[51] Int. Cl.² .............................................. B60K 17/00
[52] U.S. Cl. .......................................... 180/75; 180/88;
180/900; 280/456 A
[58] Field of Search ............ 180/1 F, 75, 88, DIG. 2,
180/900, 311, 312; 280/781, 456 A

[56] References Cited

U.S. PATENT DOCUMENTS

| | | | |
|---|---|---|---|
| 2,750,199 | 6/1956 | Hart | 180/DIG. 2 |
| 3,023,818 | 3/1962 | Miller et al. | 180/1 F |
| 4,003,444 | 1/1977 | Nobutomo et al. | 180/75 |

*Primary Examiner*—John J. Love
*Assistant Examiner*—Donn McGiehan
*Attorney, Agent, or Firm*—Koda and Androlia

[57] ABSTRACT

A two-axle, four-wheel tractor in which the tractor body composed of a transmission case is offset to one side, with a steering assembly disposed on one side of the tractor body. The tractor body, transmission unit, brake assembly and hydraulic unit for working implements for a tractor of the non-offset standard type are usable for the offset tractor. A pair of long and short rear axle cases covering a pair of rear wheel drive shafts of similarly varying lengths respectively extend outward from the tractor body provided with brakes on its opposite side walls. The rear axle cases are provided on their outer ends with downwardly extending cases each housing a reduction gear for driving the corresponding rear wheel. The tractor body has a large body-to-ground clearance with the front axle also positioned at a high level. The tractor body has on its top a hydraulic unit and at its rear portion a working implement connecting assembly extending rearward as offset from the body and the hydraulic unit in a direction opposite to the direction of offset of the body so as to render the working implement operable with stability and smoothly despite the offset arrangement of the tractor body.

6 Claims, 14 Drawing Figures

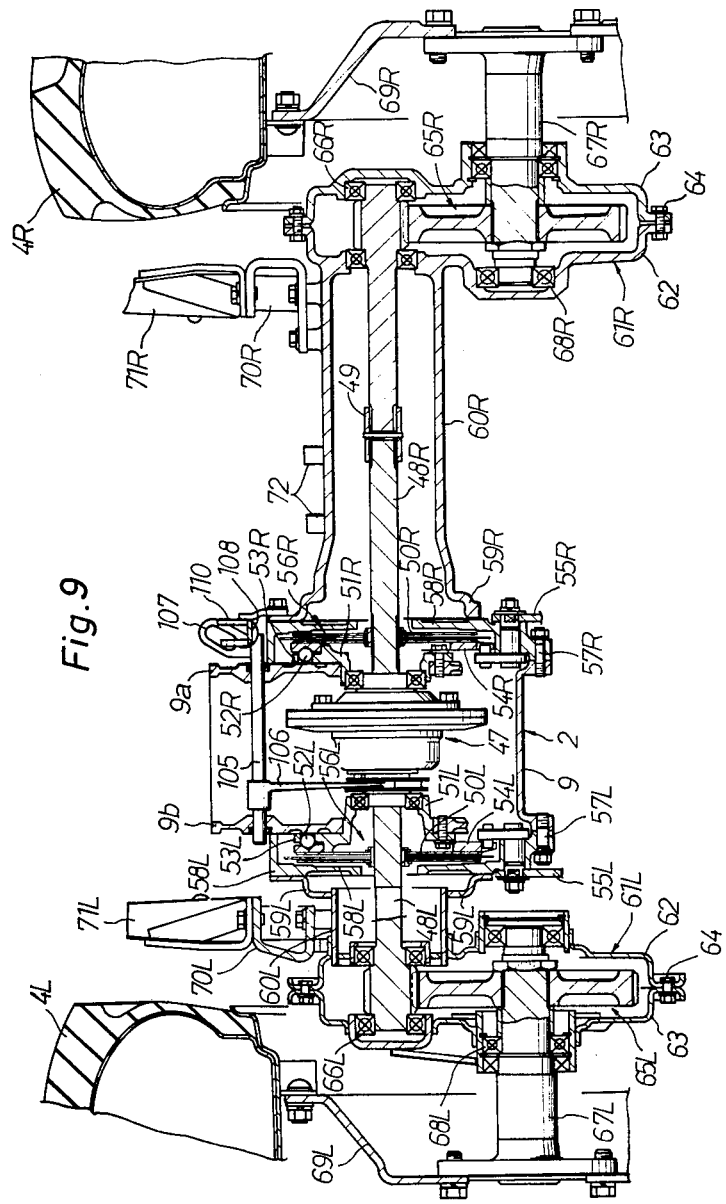

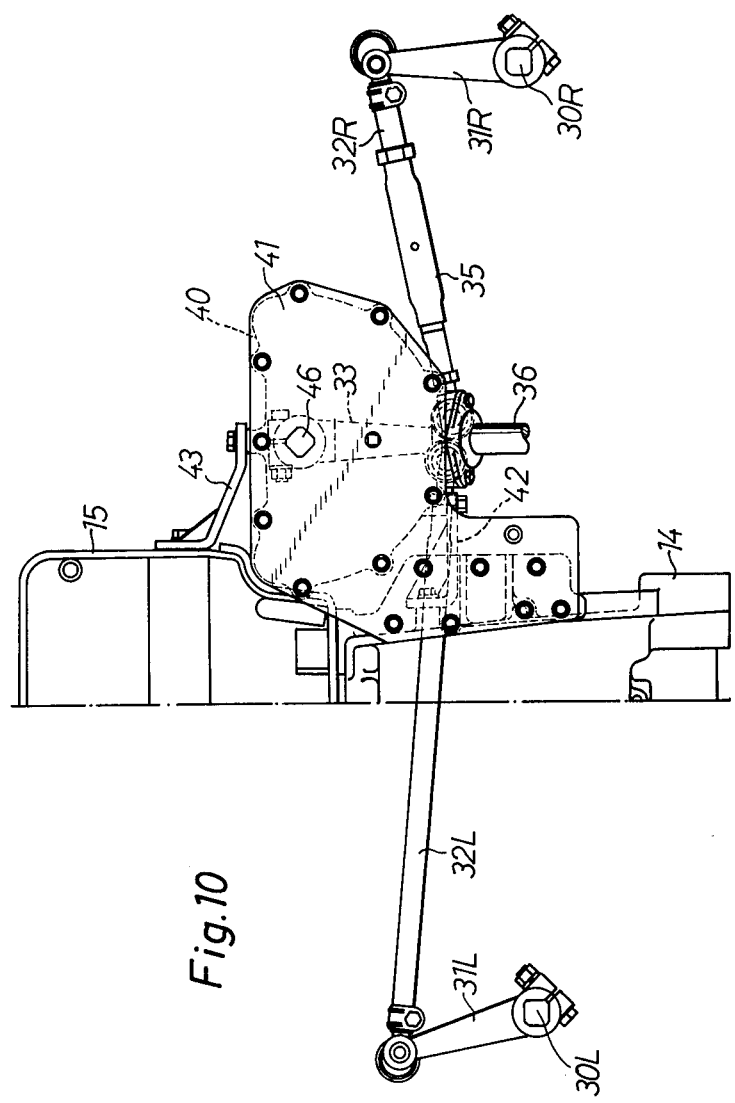

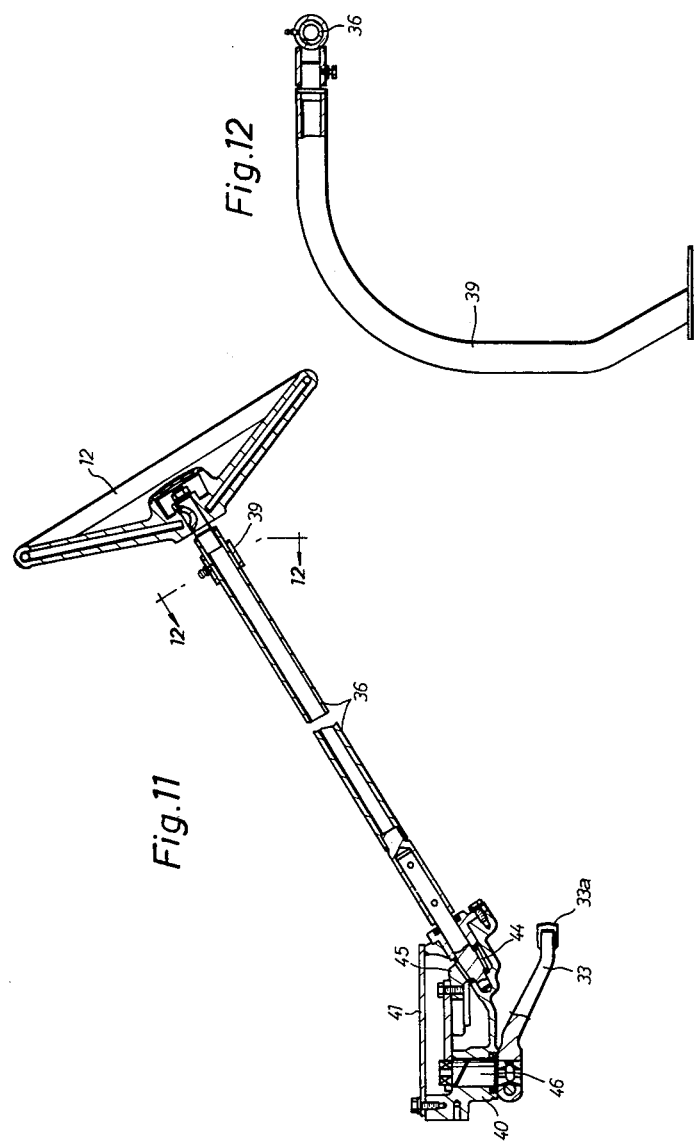

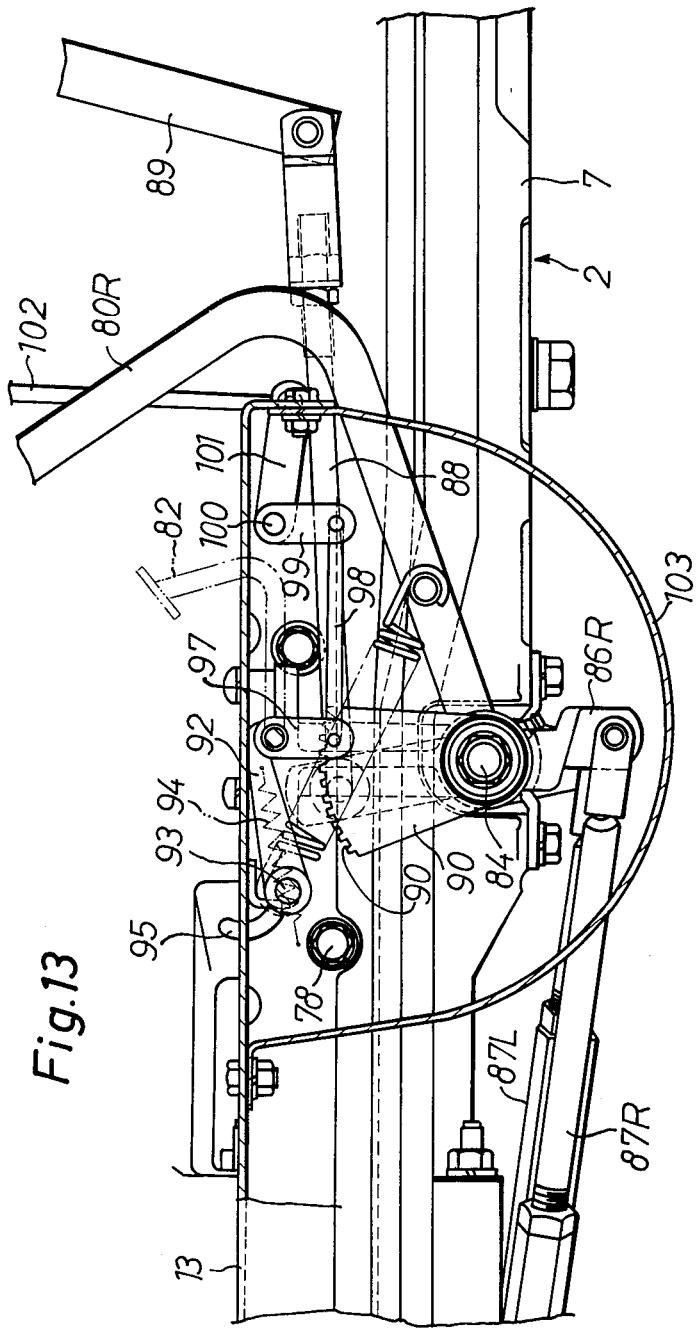

OFFSET TRACTOR

BACKGROUND OF THE INVENTION

This invention relates to a tractor, and more particularly to a two-axle, four-wheel offset tractor in which the body is offset to one side.

Tractors are widely used which are driven with various working implements mounted thereon for agricultural and civil engineering works and which are equipped with power takeoff means for carrying out works at a fixed position or for driving the working implement.

With two-axle, four-wheel tractors, those of the standard type are generally used in which the center of the tractor body composed of a transmission case as its structural element is positioned at the center of the tread.

Standard-type tractors have a relatively small body-to-ground clearance and a small tread and are therefore very inconvenient to use for tobacco and vegetable plants and are liable to damage the crop. The steering wheel and driver's seat which are positioned at the midportion of the width of the tractor body afford very poor forward and downward visibility, so that standard-type tractors are not suited to works in which the tractor must be driven between ridges.

Accordingly offset tractors in which the tractor body is offset to one side are used. Offset tractors are proposed for example in U.S. Pat. Nos. 2,221,546, 2,247,668, 3,023,818, etc.

Although offset tractors have the advantages of having a larger ground-to-body clearance and better forward visibility than standard-type tractors, offset tractors can not be produced with high efficiency since they are fabricated from special parts. Usually tractors are provided with hydraulic means for operating a plow, rotary tiller or like working implement attached to the rear of the tractor. In the case of offset tractors, the connecting means for the rear working implement adversely affect the lateral balance of the tractor under gravity. Moreover, the connecting procedure is inconvenient, and it is difficult to conduct the work effectively with high accuracy. Further when a working implement is attached to the midportion of the body in place of the rear working implement, the offset tractor body causes lateral displacement of the center of gravity, bringing the opposite wheels out of balance with each other and possibly tumbling the tractor sidewise. Thus offset tractors have low safety and low working efficiency.

SUMMARY OF THE INVENTION

An object of this invention is to provide an offset tractor including a transmission and a transmission case which can be used also for a standard-type tractor so as to reduce the number of parts specially required for the offset tractor and to thereby achieve improved productivity.

Another object of this invention is to provide an offset tractor for which the main parts of the hydraulic means mounted in a standard-type tractor for operating working implements can be commonly used and on which a rear working implement is mountable approximately at the center of the tread merely by replacing a pair of lift arms, the offset tractor thus being rendered well-balanced under gravity when the working implement is mounted thereon.

Another object of this invention is to provide an offset tractor which includes short and long rear wheel drive shafts and similarly short and long rear wheel shaft casings covering the drive shafts and which is rendered well-balanced transversely thereof despite the offset construction, the tractor having a high clearance and being adapted for stable and smooth travel.

Another object of this invention is to provide an offset tractor of simple construction the constituent parts of which can be transported as disassembled and can be easily assembled at the work site.

Another object of this invention is to provide an offset tractor which has outstanding steering characteristics and affords comfort and good forward visibility to the driver.

BRIEF DESCRIPTION OF THE DRAWINGS

FIG. 9 is a rear view in vertical section corresponding to FIG. 8 and showing another useful embodiment;

FIG. 10 is a plan view showing a front wheel steering system, especially its steering link mechanism;

FIG. 11 is a sectional view showing a steering wheel included in the front wheel steering system;

FIG. 12 is a view in section taken along the line 12—12 in FIG. 11, especially a handle stem support;

FIG. 13 is a detailed view in section taken along the line 13—13 in FIG. 6; and

DESCRIPTION OF THE PREFERRED EMBODIMENTS

The preferred embodiments of this invention will be described below with reference to the drawings.

Figure 1:
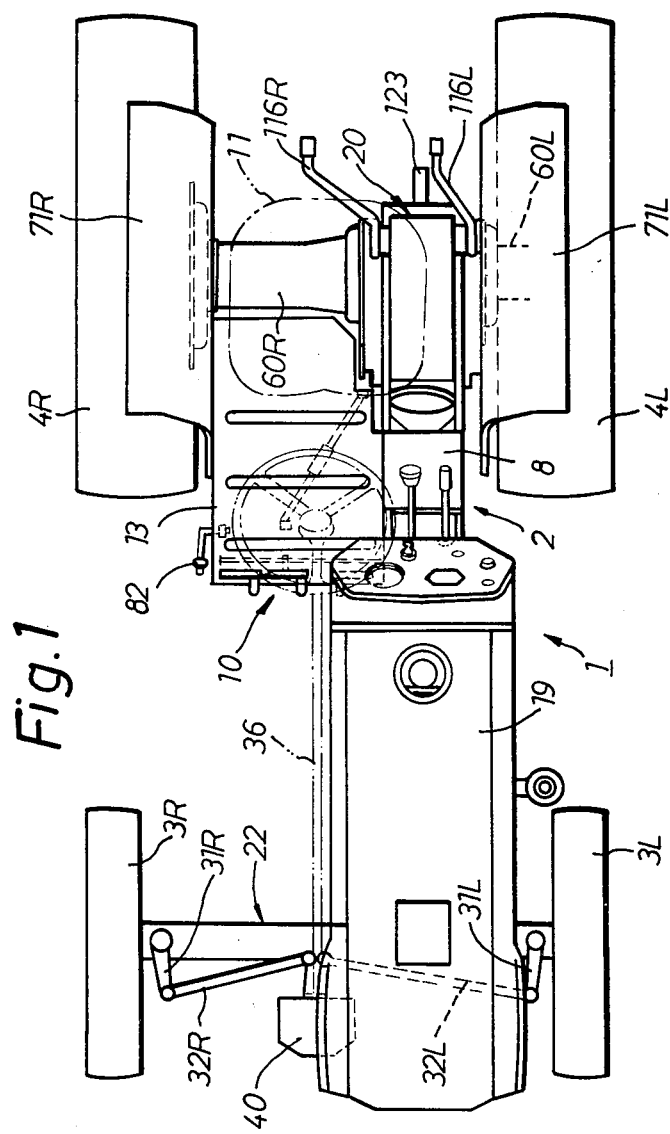
FIG. 1 is a schematic plan view showing a tractor in its entirety.
Figure 2:
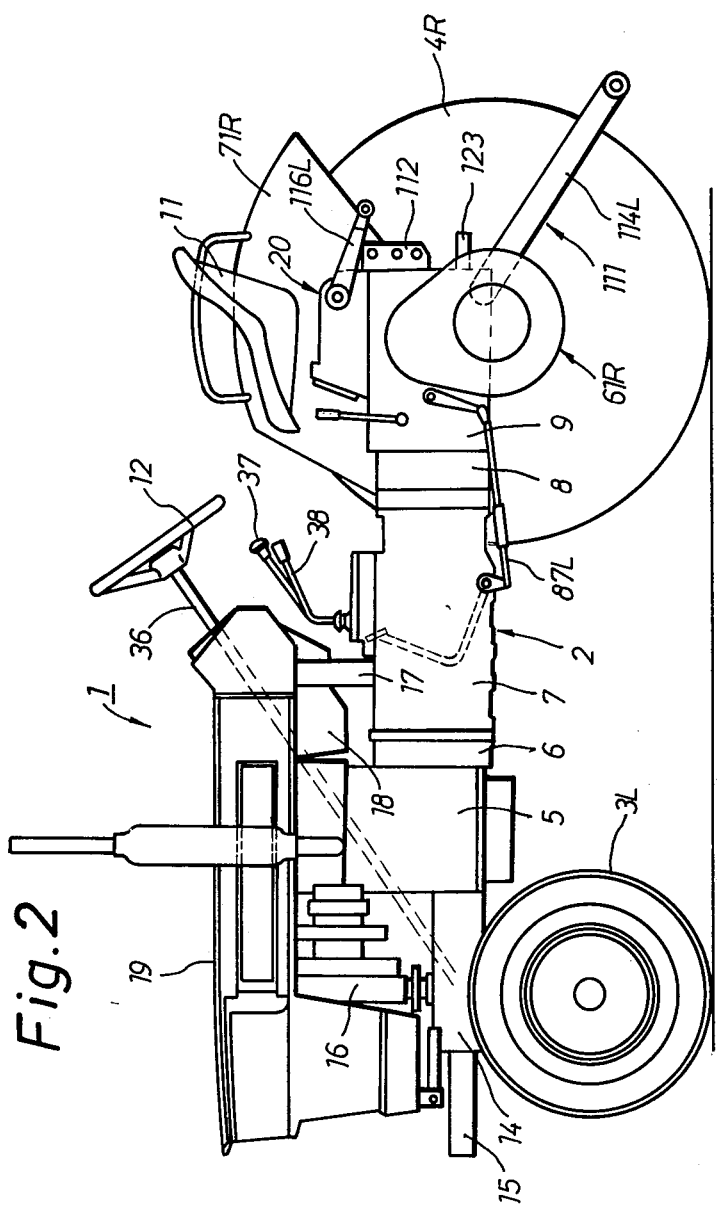
FIG. 2 is a side elevation showing the same with the left rear wheel and fender therefor removed.

FIGS. 1 and 2 show a tractor 1 in its entirety, a tractor body 2, a pair of front wheels 3L, 3R, and a pair of rear wheels 4L, 4R. An engine 5 is connected to a first transmission case 7 having a clutch housing 6. The case 7 is connected to a second transmission case 9 with or without an intermediate case 8 interposed therebetween.

The tractor body 2 is composed of the first transmission case 7, intermediate case 8 and second transmission case 9.

Steering means 10 comprising a driver's seat 11, steering wheel 12 and step 13 is disposed on one side of the tractor body 2 which is offset to the left side with respect to the center of the tread as illustrated. The tractor body 2 is positioned between the steering means 10 and the left front and rear wheels 3L, 4L.

A front axle support 14 is supported by a front lower portion of the engine 5, extends forward and carries a bumper 15 at its front portion. The support 14 supports a radiator 16 thereon. A bonnet 19 covers the radiator 16, engine 5 and fuel tank 18 supported by a pair of tank stays 17.

Hydraulic means 20 for raising or lowering a working implement has a housing 21 covering the top of the second transmission case 9.

The offset tractor of this invention, the overall appearance of which is shown in FIGS. 1 and 2, will be described below in greater detail.

Figure 3:
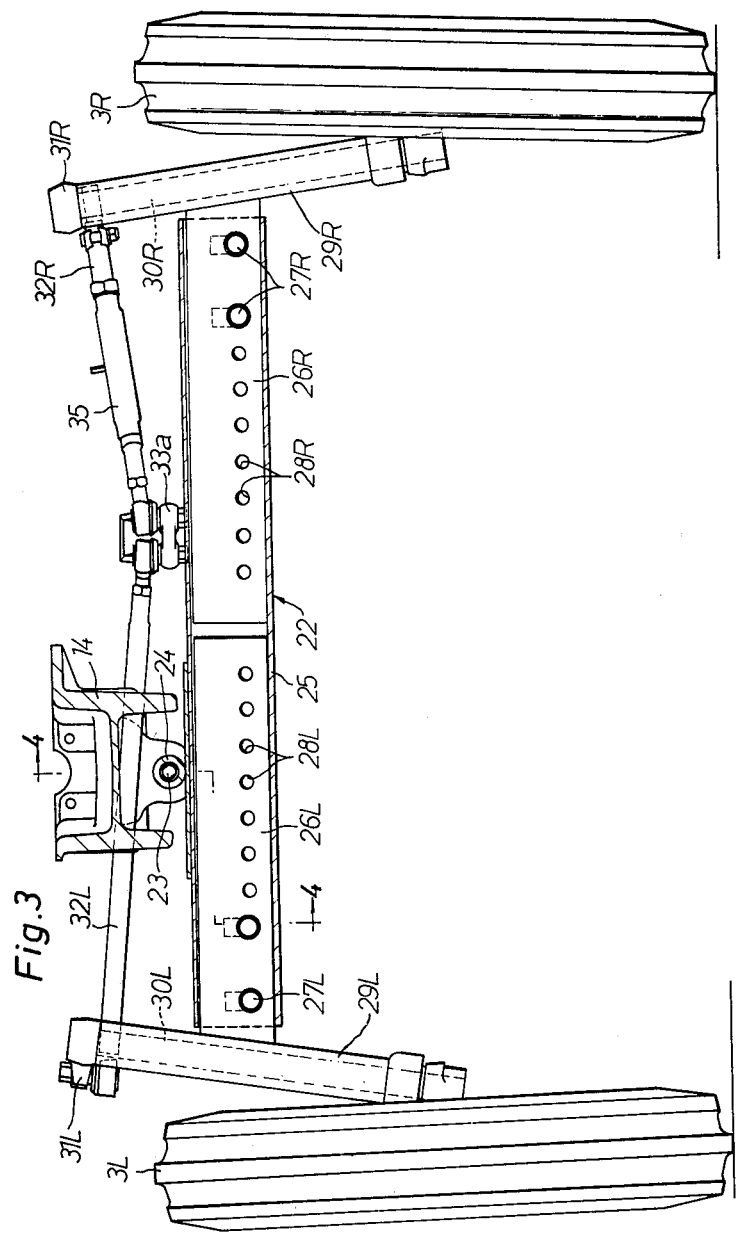
FIG. 3 is a rear view partly broken away and showing a front wheel support portion.
Figure 4:
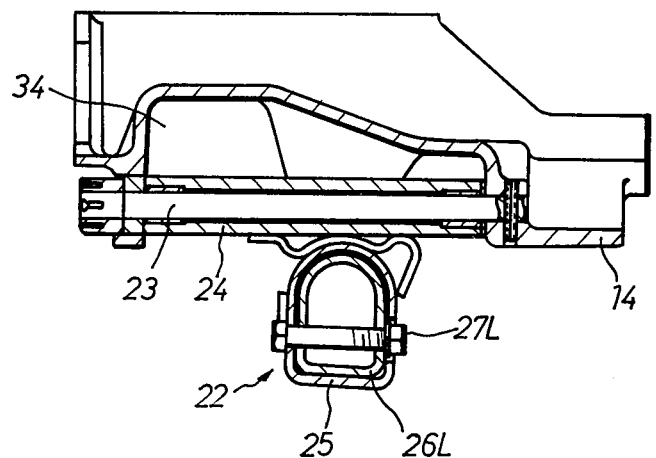
FIG. 4 is a view in section taken along the line 4—4 in FIG. 3.

With reference to FIGS. 3 and 4, a front axle 22 is supported by the support 14. The support 14 is provided with a support rod 23 extending longitudinally of the tractor. The front axle 22 is attached to a support tube 24 fitting around the support rod 23 and rotatable relative to the rod about its axis, whereby the front axle 22 is pivotably suspended. The axle 22 has the pair of front wheels 3L, 3R.

The front axle 22 comprises a main tubular member 25 and a pair of movable tubular members 26L, 26R inserted into the main tubular member and axially movable. The main tubular member 25 is formed at each of its opposite ends with two fasteners 27L (27R), while the movable tubular members 26L, 26R are extendible and lockable by means of holes 28L, 28R spaced apart axially of the tubes.

With respect to the connection between the support tube 24 and the main tubular member 25, the member 25 is longer on the right side than on the left. Thus the support 14 is offset to the left side with respect to the center of the tread of the front wheels.

The front wheels 3L, 3R are supported by the outer ends of the movable tubular members 26L, 26R by means of knuckle holding tubes 29L, 29R and knuckle pins 30L, 30R. As seen in FIG. 1 therefore, the tractor body 2 is positioned on the left of the center of the tread. Since the knuckle holding tubes 29L, 29R and knuckle pins 30L, 30R have sufficient axial lengths, the front portion of the tractor body has a sufficient clearance with respect to the ground. The knuckle pins 30L, 30R are provided at their upper ends with knuckle arms 31L, 31R which are connected to a steering arm 33 by a pair of tie rods 32L, 32R. Each of the tie rods is adjustable in its length. The left tie rod 32L has a greater length and extends laterally through a space 34 in the support 14 as seen in FIG. 4. The right tie rod 32R has a turnbuckle 35 and is short.

The steering wheel 12 is positioned on the right side of the tractor body 2 and has a stem 36 extending forwardly downward beside the bonnet 19 as seen in FIGS. 2 and 11. The rear end of the handle stem 36 is rotatably supported by a bent bar 39 which is disposed free of inteference with a traveling speed change lever 37 and a PTO speed change lever 38 mounted on the center portion of the body 2, namely on the first transmission case 7 (see FIGS. 1, 11 and 12). The front end of the handle stem 36 is rotatably supported by a steering gear box 40. The steering gear box 40 is disposed on the right side of the portion where the bumper 15 is attached to the front axle support 14. The box 40 is connected to the support 14 by a top plate 41 and a mounting member 42 and attached to the bumper 15 by a mounting member 43 (see FIG. 10). The steering gear box 40 houses a bevel gear 44 integral with the handle stem 36 and a sector gear 45 meshing with the gear 44 and secured to a sector rod 46 having the steering arm 33 at its lower end (see FIG. 11). As already described, the joint portion 33a of the steering arm 33 is connected to the pair of knuckle arms 31L, 31R by the pair of tie rods 32L, 32R.

Figure 8:
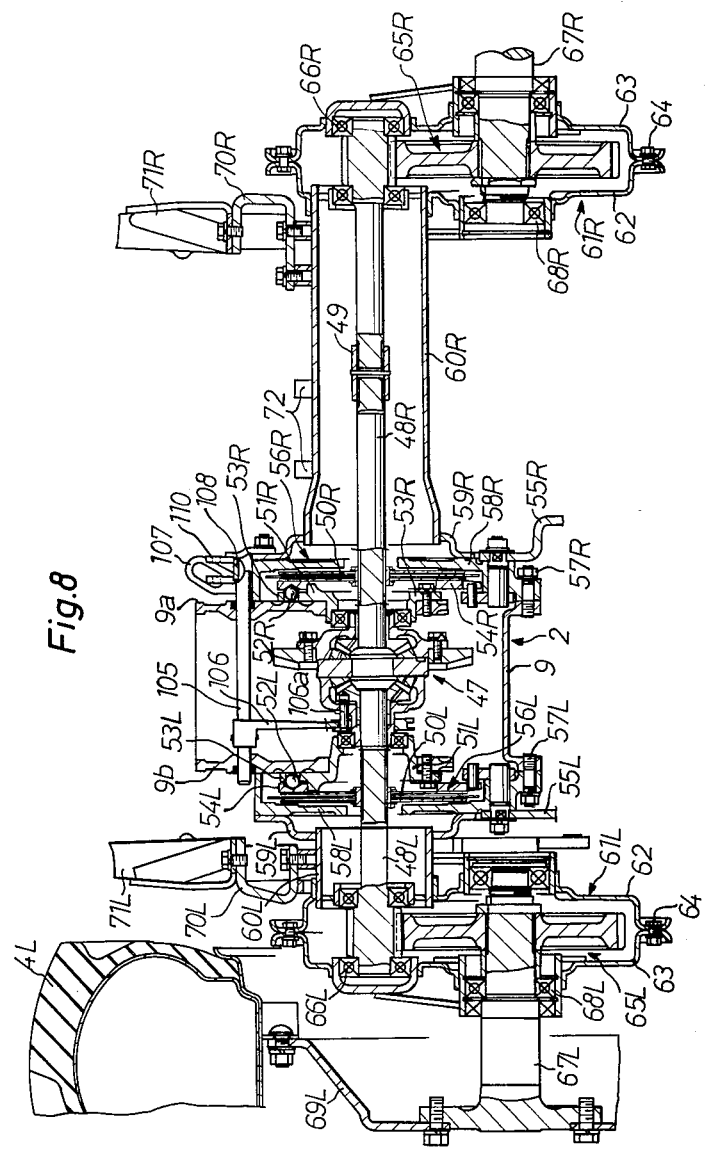
FIG. 8 is a fragmentary rear view in vertical section showing a rear axle case support portion in the rear of the tractor.

The first and second transmission cases 7 and 9 providing the tractor body 2 accommodate suitable transmission means. FIGS. 8 and 9 show in detail the second transmission case 9 housing rear wheel differential means and a rear wheel support assembly. A pair of rear wheel drive shafts 48L, 48R extending outward from the differential means 47 have different axial lengths. In the illustrated embodiment, the drive shaft 48L is shorter than the drive shaft 48R. Preferably the right drive shaft 48R is composed of divided segments which are joined together by a coupling 49 as shown, but the shaft can be in the form of a single integral shaft.

The drive shafts 48L, 48R of varying lengths extend through the side walls 9a, 9b of the second transmission case 9 respectively and carry brake disks 50L, 50R outside the case. A pair of bearing cases 51L, 51R support the differential means 47 and partly serve as retainer plates 53L, 53R for brake balls 52L, 52R. The retainer plates 53L, 53R have projections for circumferentially turnably supporting brake cam plates 54L, 54R. The balls 52L, 52R and ball receiving portions formed on the cam plates 54L, 54R cooperate to provide thrust means.

Brake cam levers 55L, 55R have portions in engagement with the cam plates 54L, 54R, such that when an actuating force is delivered to the levers 55L, 55R, the disk brakes 56L, 56R are individually operated to brake the rear wheel drive shafts 48L, 48R respectively.

As illustrated, the pair of brakes 56L, 56R are positioned outside the side walls 9a, 9b of the second transmission case 9 and are covered with brake cases 58L, 58R detachably fastened to the outer faces of the side walls 9a, 9b by bolts 57L, 57R.

The brakes cases 58L, 58R are usually made of casting and symmetrically arranged. The brakes 56L, 56R are also identical. Case covers 59L, 59R made of sheet metal are detachably fastened by unillustrated bolts to the outer faces of the brake cases 58L, 58R as shown in FIG. 8. The drive shafts 48L, 48R extend outward from the case covers 59L, 59R.

A pair of rear axle cases 60L, 60R have different lengths to cover the pair of drive shafts 48L, 48R and are fastened at their inner ends to the brake cases 59L, 59R as by bolts. The rear axle cases 60L, 60R may be made by cutting a sheet metal or steel pipe to suitable dimensions as seen in FIG. 8. Alternatively, the longer case may be made of casting, and the short case of material different from and lighter than casting, for example in the form of sheet metal or steel pipe, as illustrated in FIG. 9.

With the embodiment shown in FIG. 8, the long case 60R is radially outwardly enlarged by press work at its inner end, and the enlarged end is welded to the case cover 59R. The short case is made by cutting a steel pipe, and the case is welded to the case cover 59L.

Of course, both cases 60L, 60R can be made by cutting a sheet metal or steel pipe.

FIG. 9 shows a modified embodiment in which the tractor body 2 is offset to one side, with consideration given to keep the opposite sides of the tractor in balance under gravity. The long case 60R and brake case cover 59R are both made of casting, while the short case 60L is made of sheet metal or steel pipe as in FIG. 8, whereby the tractor body can be well balanced despite the offset arrangement.

A pair of cases 61L, 61R each comprise a first case 62 and a second case 63 fastened together by bolts 64 as arranged face-to-face to provide a hollow space therebetween. The cases 61L, 61R are disposed at the outer ends of the rear axle cases 60L, 60R in downwardly extending manner. With the embodiment of FIG. 8, the first cases 62 made from sheet metal are welded to the outer ends of the cases 60L, 60R, and the second cases 63 of sheet metal is fitted to first cases with reduction gears 65L, 65R housed in the interior spaces.

With the embodiment of FIG. 9, the first case 62 of the right case 61R is made of casting integral with the case 60R, and the second case 63 of casting is attached to the case 62. This gives improved balance to the tractor, with better results than when the rear axle case 60R alone is made from casting.

Although not shown, one of the first and second cases 62, 63 of each case 61 may be made of casting, with the other made of sheet metal.

Since the rear axle cases 60L, 60R of varying lengths extend substantially horizontally from the opposite side walls of the body 2 with downwardly extending cases 61L, 61R mounted on the outer ends of the cases, the rear wheel supporting portion can be positioned at a high level.

The outer ends of the drive shafts 48L, 48R are supported by bearing means 66L, 66R at the upper portions of the cases 61L, 61R, the lower portions of which support hub shafts 67L, 67R by bearing means 68L, 68R. The reduction gears 65L, 65R are interposed between the drive shafts and the hub shafts.

The pair of hub shafts 67L, 67R support the rear wheels 4L, 4R by means of disks 69L, 69R. In FIG. 8, the disks are made of sheet metal, whereas in FIG. 9, the right disk 69R is made of casting with the left disk 69L made of sheet metal.

FIGS. 8 and 9 further show fender mountings 70L, 70R mounted on the rear axle cases 60L, 60R by bolts. A pair of fenders 71L, 71R extending upright inside the rear wheels 4L, 4R are supported by the mountings. Bosses 72 for mounting a driver's seat are provided on an intermediate portion of the longer case 60R. Brackets 73 are bolted to the bosses, and the seat 11 is supprted by the brackets 73 with elastic cushioning means 74 provided therebetween. as seen in FIG. 6.

As shown in the same drawing, the elastic cushioning means 74 comprises a box 75 mounted on the brackets 73, elastic means 76 housed in the box 75 and parallel links 77 interconnecting the box and the driver's seat.

Figure 6:
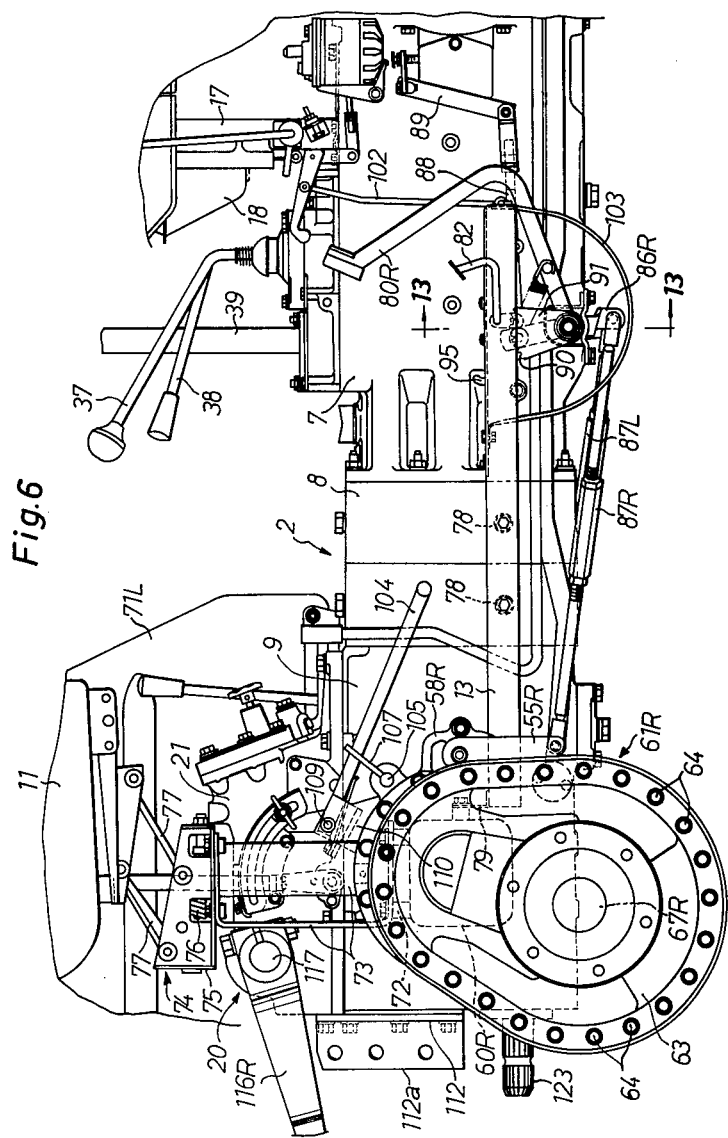
FIG. 6 is a right side elevation showing the center portion of the tractor body with some parts omitted.
Figure 7:
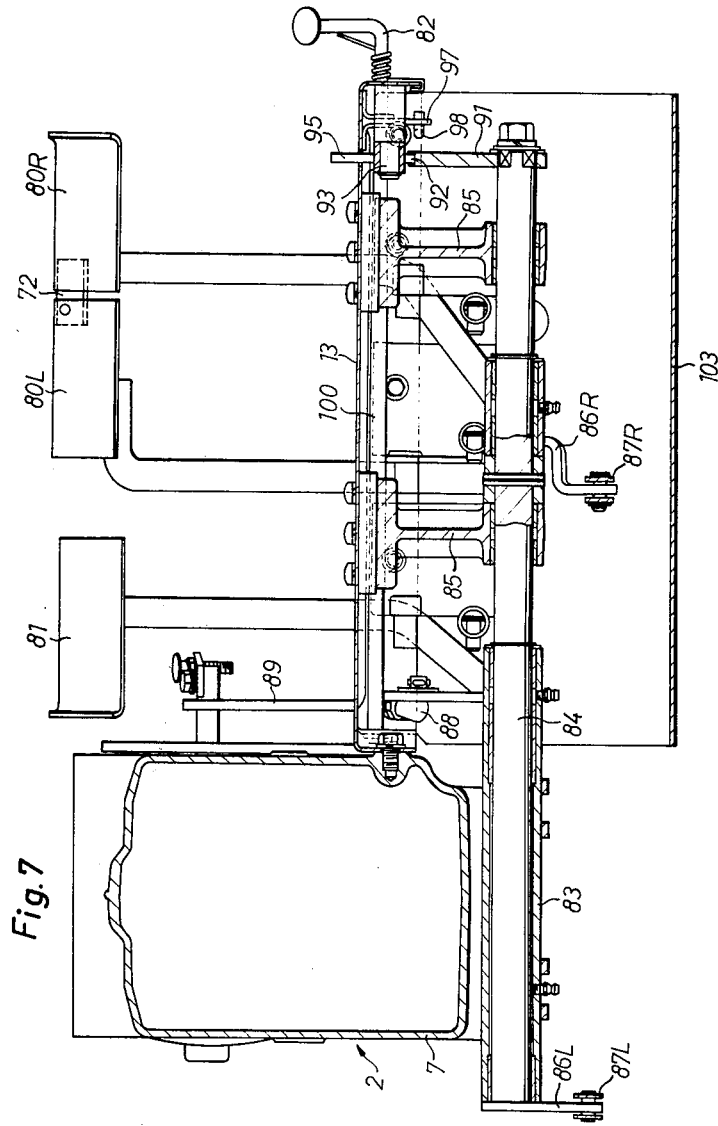
FIG. 7 is a view in vertical section showing the center portion of the tractor with the transmission omitted.

With reference to FIGS. 6, 7 and 13, the steering means 10 will be described in detail. A step 13 provided between the tractor body 2 and the fender 71R extends from approximate longitudinal midportion of the body 2 toward the rear axle case 60R. The step 13 is secured to a lower right side portion of the body 2 by bolts 78 and to the rear axle case 60R by a mounting piece 79 as seen in FIGS. 6 and 13. At the front end of the step 13, brake pedals 80L, 80R and a clutch pedal 81 are arranged transversely of the tractor. An accelerator pedal 82 is disposed at the outer end of the step. A pedal rod 84 is rotatably supported by a tubular holder 83 on the bottom of the tractor body 2 transversely thereof and extends below the step 13 to the outer end thereof. The extension is supported by a pair of bearing members 85 on the under side of the step 13 and supports the brake pedals 80L, 80R and clutch pedal 81. The left brake pedal 80L is secured to the pedal rod 84 and coupled to the brake cam lever 55L of the left brake 56L by way of a projection 86L on the left end of the pedal rod 84 and a brake rod 87L on the left side of the tractor body 2. The right brake pedal 80R loosely supported on the pedal rod 84 is coupled to the brake cam lever 55R of the right brake 56R through a projection 86R and a brake rod 87R on the right side of the tractor body 2. The clutch pedal 81 rotatably supported by the pedal rod 84 is coupled to the engine clutch through a clutch rod 88 and a clutch lever 89. As seen in FIG. 13, the pedal rod 84 is provided at its outer end with a sector 91 having an engaging portion 90 engageable with a pawl 92 pivotally supported by a pin 93 on the step 13. The pawl is biased by a tension spring 94. The knob 95 of the pawl 92 projects above the step 13. The brake pedals 80L, 80R are interconnected by a disengageable member 96. When the brake pedals 80L, 80R are forced down, actuating the brakes 56L, 56R, and the pawl 92 is engaged with the portion 90 of the sector 91 by the knob 95, the brake pedals 80L, 80R can be locked to the braking position, causing the brakes 56L, 56R to act as parking brakes. When the knob 95 is depressed, the pawl 92 is brought out of engagement with the portion 90 of the sector 91, thereby disengaging the parking brakes. The accelerator pedal 82 is coupled to the speed control means of the engine 5 by way of a link 97, rod 98, link 99, pin 100, link 101 and rod 102 shown in FIG. 13. The pedal rod 84 and associated parts are covered by a cover 103 attached to the step 13.

FIG. 6 shows a differential lockng pedal 104 disposed on the right side of the tractor body 2. A pedal rod 105 is rotatably supported by an upper portion of the second transmission case 9 and extends transversely of the case to cause a fork 106 to bring a differential locking pin 106a into or out of engagement with a differential gear. The stem of the pedal 104 which can be depressed pivotally about a pin 109 against a leaf spring 108 extends through an aperture of a cam plate 107 on the outer end of the pedal rod 105. Indicated at 110 is a pedal holding plate.

Figure 5:
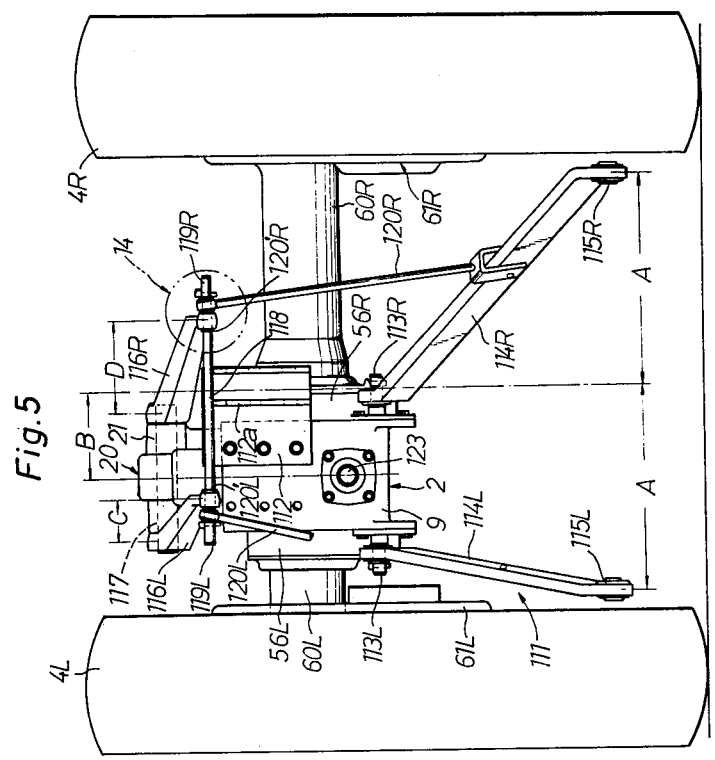
FIG. 5 is a rear view showing the main parts of the tractor, with rear wheel fenders, driver's seat, etc. omitted.

With reference to FIGS. 1, 2 and 5, working implement connecting means 111 and the hydraulic means 20 for raising or lowering a working implement will be described in detail.

The connecting means 111 shown is a three-point link mechanism. As seen in FIG. 5, a top link mounting 112 is attached to a rear upper portion of the tractor body 2. The mechanism comprises a top link (not shown) supported by a portion 112a of the mounting 112 and a pair of lower links 114L, 114R pivoted to the opposite sides of a lower portion of the body 2 by pins 113L, 113R. The lower link 114 has an increased length and is greatly bent toward the rear wheel 4R so that ball joint portions 115L, 115R on the rear ends of the lower links will be positioned at an equal distance A from the center of the tread of the rear wheels 4L, 4R. Accordingly the working implement to be mounted by the three-point mechanism 111 will be offset by B to the right side with respect to the tractor body 2 and positioned approximately at the center between the rear wheels 4L, 4R.

The hydraulic means 20 has a housing 21 mounted on the second transmission case 9 and a pair of opposite lift arms 116L, 116R extending rearward and bent toward the center of the rear wheel tread. The lift arm 116R is longer than the lift arm 116L. The lateral distance between the free end of the arm 116R and its base end connected to a hydraulic arm shaft 117, D, is greater than the corresponding distance of the arm 116L, C. For the lift arms 116L, 116R to conjointly support the load of the working implement during raising or lowering, the free ends of the arms are interconnected by a connector 118. The connector 118 serves also as pins 119L, 119R for connecting lift rods 120L, 120R and has a pair of stoppers 120'L, 120'R. The connecting pins 119L, 119R are inserted into pin holes in the free ends of the lift arms 116L, 116R and connected to the lift rods 120L, 120R connected to the lower links 114L, 114R. One of the lift rods 120L, 120R is rendered adjustable in its length.

Figure 14:
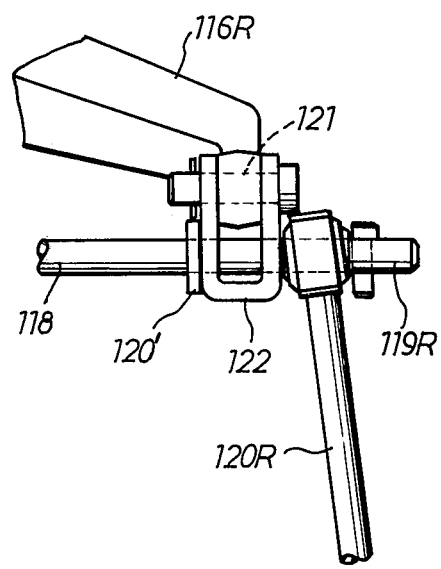
FIG. 14 is a detailed view showing a modification of the portion indicated by an arrow 14 in FIG. 5.

Although the pair of lift arms 116L, 116R are interconnected directly by the connector 118, the lift arms may be provided with U-shaped members 122 respectively which may be connected together by the connector 118 as seen in FIG. 14.

The connecting means 111 is not limited to the three-point link mechansim but may be similarly embodied in the form of a two-point link mechanism.

FIG. 5 also shows a rear PTO shaft 123, above which the top link mounting 112 is detachably mounted. The mounting portion 112a is positioned between the lift arms 116L and 116R which are detachably mounted on the arm shaft 117.

The link mechansim of the connecting means 111 shown in FIG. 5 is so designed that the working implement will be positioned approximately at the center of the rear wheel tread, so that despite the offset arrangement of the tractor body 2 the center of gravity can be positioned at the center of the rear wheel tread. Accordingly the structure provided effectively prevents sinking of the rear wheel on one side during operation with a rotary tiller as in a paddy field or lateral tumbling of the tractor during works on a sloping field, thus assuring the desired operation with high stability. Further when the lift arms 116L, 116R are bent toward the center of the rear wheel tread in corresponding relation to the link mechanism, the lift arm 116 must be elongated as seen in FIG. 5 and therefore will have reduced strength, possibly undergoing deformation when subjected to the load of the working implement during raising or lowering. However, the connector 118 interconnecting the free ends of the lift arms 116L, 116R permits the lift arm 116L to partially support the load on the lift arm 116R, thereby greatly reinforcing the lift arm 116R and ensuring prompt raising or lowering of the working implement.

Moreover, since the housing 21 of the hydraulic means 20 is mounted on the tractor body 2, with the lift arms 116L, 116R provided in an offset arrangement, a standard type tractor body is usable also for the offset tractor body 2, with reliable connection assured for the desired operation.

With the construction described above, the contemplated objects of this invention are fully achievable. Because the brakes 56L, 56R provided outside the tractor body 2 incorporating the differential means 47 are of the same construction as in the standard-type tractor and because the transmission means within the tractor body 2 is of the same structure as that of the standard type, the use of the rear wheel drive shafts 48L, 48R of varying lengths as well as the cases 60L, 60R of similarly varying lengths makes it possible to provide an offset tractor which is very easy to manufacture and assemble while retaining the full usefulness of such tractors.

What is claimed is:

1. In a two-axle four-wheel offset tractor including a tractor body composed of a transmission case as its structural element and offset to one side with respect to the center of the tread of the wheels, steering means disposed on one side of the tractor body opposite to its offset side and including a driver's seat, a steering wheel, brake and clutch pedals and a step, and hydraulic means for raising and lowering a working implement and working implement connecting means mounted on a top rear portion of the tractor body, the improvement comprising:

a long rear wheel drive shaft and a short rear wheel drive shaft outwardly extending from differential means in the transmission case and covered with a long rear axle case and a short rear axle case respectively, each of the axle cases being provided with a rear wheel brake device between its inner end and the side wall of the tractor body opposite thereto and with a downwardly extending case housing a terminal speed reduction gear;

the step of the steering means being attached to the transmission case and supported at its rear portion by the long rear axle case, seat support means being mounted on the long rear axle case beside the hydraulic means and supporting the driver's seat with cushioning means provided therebetween;

the hydraulic means having a pair of lift arms pivoted to its side walls and mounted directly on the top of the transmission case beside the seat support means, the pair of lift arms being bent toward the seat from the hydraulic means and extending rearwardly of the seat toward one side opposite to the offset side of the tractor body, the pair of lift arms having free ends respectively disposed on opposite sides of a line through the center of the tread; and the working implement connecting means including a pair of opposite lower links pivoted at their base ends to opposite sides of a lower rear portion of the transmission case and supported at intermediate portions thereof by lift rods attached to the free ends of the lift arms, the lower links having free ends opposed to each other between the opposite wheels with the midpoint between the lower link free ends offset with respect to the tractor body, a top link mounting being attached to a rear portion of the transmission case and positioned closer to one side thereof toward the midpoint.

2. An offset tractor as defined in claim 1, wherein the long and short rear axle cases, brake cases for the rear wheel brake devices and downwardly extending cases are made of sheet metal, and the rear axle cases are attached at their inner ends to the brake cases.

3. An offset tractor as defined in claim 1, wherein the clutch pedal and a pair of the brake pedals are arranged side by side transversely of the tractor at a front portion of the step, the step front portion being positioned toward the front of the tractor body from the outer periphery of the rear wheel, the step including a portion of increased area between one side of the tractor body and the rear wheel close to the long rear axle case.

4. An offset tractor as defined in claim 1, wherein a front axle case is supported by a rod extending longitudinally of the tractor and mounted on a front axle support, the front axle support being mounted on a front lower portion of the tractor body, a steering box being provided on one side of the front axle support and serving as a steering element, a handle stem extending obliquely rearward from the steering box and having the steering wheel disposed to the front of the driver's seat.

5. An offset tractor as defined in claim 1, wherein the pivoted base ends of the pair of lift arms and the pivoted base ends of the pair of lower arms have their pivot portions positioned in the same vertical plane, and the pair of lift arms extend toward the driver's seat rearwardly thereof so as not to interfere with the seat, the pair of lower links being different in length.

6. An offset tractor as defined in claim 1 wherein the pair of lift arms are interconnected at their free ends by a connector, and the connector is connected to the intermediate portions of the lower links by lift rods.

* * * * *